United States Patent [19]

Bujas

[11] 4,028,446
[45] June 7, 1977

[54] METHOD AND DEVICE FOR THE FABRICATION OF NUCLEAR FUEL COMPACTS

[75] Inventor: Roko Bujas, Gif-sur-Yvette, France

[73] Assignee: Commissariat a l'Energie Atomique, Paris, France

[22] Filed: Apr. 24, 1975

[21] Appl. No.: 571,390

[30] Foreign Application Priority Data

May 3, 1974 France .............................. 74.15480

[52] U.S. Cl. .......................... 264/.5; 252/301.1 R; 425/117; 425/129 R
[51] Int. Cl.² .................................... G21C 21/00
[58] Field of Search ............. 264/.5, 101, 128, 36; 252/301.1 R; 165/154; 425/117, 129 R

[56] References Cited

UNITED STATES PATENTS

| | | | |
|---|---|---|---|
| 1,733,699 | 10/1929 | Schutte | 264/101 |
| 1,883,196 | 10/1932 | Wertz | 264/36 |
| 3,182,102 | 5/1965 | Simnad | 264/.5 |
| 3,191,671 | 6/1965 | Horne et al. | 165/154 |
| 3,558,750 | 1/1971 | Davis et al. | 264/.5 |
| 3,683,760 | 8/1972 | Silva | 264/DIG. 44 |
| 3,763,292 | 10/1973 | Stradley et al. | 264/.5 |
| 3,838,184 | 9/1974 | Gyarmati et al. | 264/.5 |

Primary Examiner—Leland A. Sebastian
Attorney, Agent, or Firm—Flynn & Frishauf

[57] ABSTRACT

In a method for the fabrication of nuclear fuel compacts, a cylindrical mold is filled with coated particles containing fissile and fertile material as well as grains of graphite if necessary. The mold is heated to a temperature above the softening temperature of pitch which is injected into the mold in the hot state through openings provided at regular intervals along the mold wall and having a diameter which is smaller than the size of the coated particles, the injection of pitch being carried out at right angles to the generator-lines of the cylinder formed by the mold.

8 Claims, 2 Drawing Figures

METHOD AND DEVICE FOR THE FABRICATION OF NUCLEAR FUEL COMPACTS

This invention relates to a method of fabrication of nuclear fuel compacts which makes it possible to form compacts of elongated cylindrical shape without any attendant danger of fracture or crack formation in the coated spherical particles which constitute the compact and contain fissile or fertile materials.

The invention also relates to devices for the practical application of said method.

It is known that, in high-temperature reactors, the nuclear fuel consists of refractory spherical particles containing either fissile or fertile material or both (for example $UO_2$ or $ThO_2$); these spherical particles are commonly referred-to as "kernels" and such kernels are covered with an impervious sheath or so-called "coating" which is made up of refractory pyrolitic materials such as carbon or silicon carbide. Kernels covered in this manner are known as coated particles; such particles are bonded to each other by a matrix composed of graphite and non-graphitized carbon so as to form blocks known as compacts. Finally the compacts are placed in graphite components which are in turn cooled by a stream of helium.

In order to prevent contamination of certain reactor components, practically all the coated particles must essentially retain the fission products produced by their kernels during irradiation and the coatings must accordingly remain intact. It is necessary in particular to fabricate compacts without causing damage to the coatings. In some cases, the compacts must contain two types of coated particles which may have fairly different particle size and density spectra. It is desirable to ensure that the particles of both types are distributed within the compacts as uniformly as possible in order to avoid hot spots within the reactor since the lifetime of the particles at these hot spots would certainly be reduced.

One method of forming compacts consists in injecting under pressure between juxtaposed coated particles a mixture of graphite powder and of pitch (pitch is a distillation residue of tars). The injection is carried out at a temperature at which the pitch is in the liquid state.

In arrangements of the prior art, the nuclear fuel compacts which are primarily intended to be employed in high-temperature reactors are obtained as follows:

coated particles which contain fissile and fertile materials and may also contain graphite grains dispersed in a very homogeneous manner are introduced into a mold. The graphite grains must have a highly accurate shape and particle size in order to offer low resistance to the flow of pitch which is to be injected in a subsequent operation, the mold is heated to a temperature above the softening temperature of the pitch, the pitch is injected at the bottom through a hole having a diameter which is smaller than that of the coated particles or through an annular space having a width which is smaller than the diameter of the particles. The pitch is usually charged with graphite powder of controlled particle size.

The final step consists in cooling and ejecting the compact from the mold.

This known method of fabrication of compacts has a first disadvantage in that it requires the use of graphite grains of well-defined particle size and thus entailing high capital cost; furthermore, the length of the compacts is limited to approximately 60 mm, this limitation being intended to prevent breakages of particles which might be caused by the high pitch-injection pressure which is necessary to ensure that the pitch passes through the entire length of compacts of larger size.

The necessarily smaller length of compacts of the prior art also results in high production costs.

The present invention is directed to a method of fabrication of nuclear fuel compacts which makes it possible to form compacts of greater length with a higher degree of reliability.

In more precise terms, the method of fabrication in accordance with the invention consists in filling a cylindrical mold with coated particles containing fissile and fertile materials accompanied if necessary by grains of graphite and in heating said mold to a temperature which is higher than the softening temperature of pitch; said pitch is injected into said hot mold through openings located at regular intervals over the entire length of the mold wall, the injection being performed at right angles to the generator-lines of the cylinder constituted by the mold and through said openings whose diameter is smaller than the size of the coated particles.

The method according to the invention has the advantage of injecting the pitch along the smallest dimension of the compact, that is to say approximately along a radius of the base circle of the compact. The path followed by the pitch through the bed of particles is considerably reduced in some cases by a factor greater than 10. This permits the use of graphite grains which are less accurately sorted in regard to both shape and diameter whilst the length of the compacts is considerably increased.

In one embodiment of the invention, the pitch is injected in a radial direction pointing towards the exterior of the cylinder which constitutes the mold; the pitch is stored within an internal cylindrical passage which is pierced by openings and constitutes the internal wall of the mold. Since the mold is annular, this process results in the production of a compact of annular shape after removal from the mold.

It is readily apparent that the central cavity which results from the presence of the injection element (the central cylindrical duct) can be filled either with pellets of pitch or with graphite after removal of said annular compact from the mold.

In accordance with another embodiment of the method according to the invention, the pitch is injected through openings located at the exterior of the cylindrical mold, the pitch being intended to flow towards the axis of the cylinder. Solid cylindrical compacts are thus formed.

The invention also relates to a device for the application of the method which essentially comprises for the fabrication of compacts of annular shape:

a mold of approximately annular shape filled with coated particles and if necessary with grains of graphite, means for controlling the temperature of said mold, a hollow cylindrical central duct constituting the internal wall of said mold; said duct contains pitch under pressure and is pierced by radial openings through which the pitch is injected into the interior of the mold, two pistons performing the function of plugs, said pistons being located at the upper and lower ends of said mold, means such as a press for injecting the pitch under pressure into the interior of the central duct.

In one embodiment of the invention, the central duct contains a leak-tight piping system in which oil is circulated.

In an alternative embodiment of the invention for the fabrication of solid cylindrical compacts, the device comprises:

a mold of approximately cylindrical shape filled with coated particles and if necessary with grains of graphite, means for controlling the temperature, channels which are cut in the mold wall and communicate with the interior of the mold through radial openings, two plungers which perform the function of end plugs and are located at the upper and lower ends of said mold, means such as a press for injecting the pitch under pressure into the interior of said grooves.

The means for controlling the temperature of said mold are of any desired type but are advantageously constituted by a system for the circulation of a thermal fluid such as oil whose temperature can be regulated according to whether it is desired to liquefy the pitch or remove the compact from the mold, said oil circulation system being in contact with the wall of the mold.

The temperature of injection of the pitch is in the vicinity of 180° C whilst the injection pressure is in the vicinity of 80 bar.

Further properties and advantages of the invention will become more readily apparent from the following description in which examples of construction are given by way of explanation without any limitation being implied, reference being made to the accompanying drawings, wherein.

Figures 1, 2:
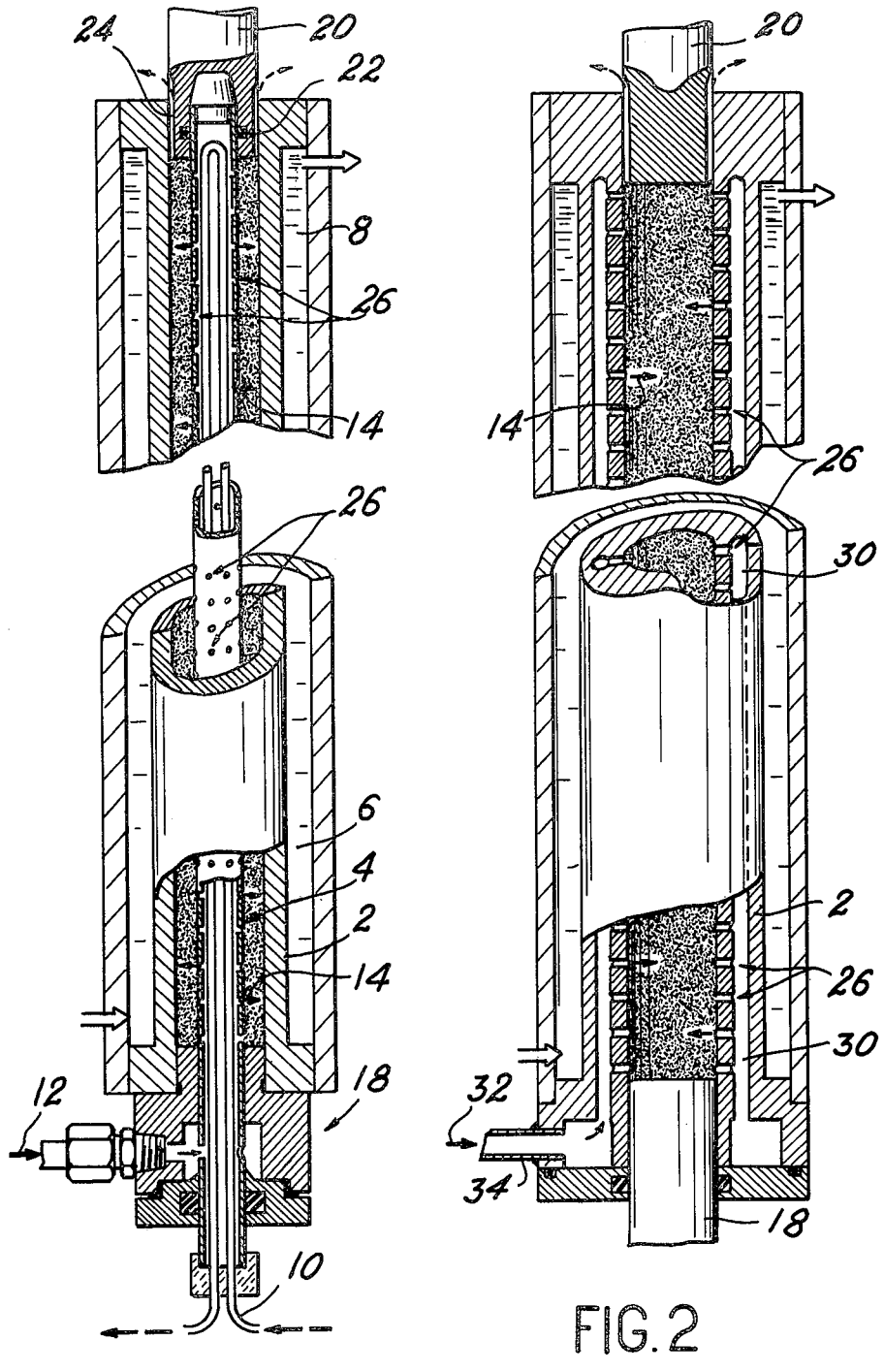
FIG. 1 is a diagram of the device in accordance with the invention for the formation of annular compacts.
FIG. 2 is a diagram of an alternative design of the device which is intended to carry the invention into practical effect and to form solid cylindrical compacts.

FIG. 1 shows a partial sectional view of one embodiment of the invention. The mold which is composed of an outer cylindrical enclosure 2 and a central duct 4 defines an annular space 6 for storing the coated particles and the graphite which are intended to form the compact. An oil circulation system 8 serves to control the temperature of the portion 2 of the mold whilst the oil circulation system 10 serves to control the temperature of the pitch which is present within the central duct 4. An injection system (not shown in the figure) feeds the pitch into the central duct 4 in the direction shown by the arrow 12. The pitch under pressure is discharged from the central duct 4 in the direction of the arrows such as 14 at right angles to the generator-lines of the cylinder constituting the portion 2 of the mold. The upper and lower ends of the mold are closed by the end plugs 18 and 20. The plug 20 which forms a plunger is tightly secured to the central duct 4 by means of seals 22 and pierced by vents 24. The openings such as those designated by the reference 26 and pierced in the central duct 4 are smaller in diameter than the coated particles in order to prevent these latter from penetrating into the central duct 4 which contains the pitch.

In order to form a compact, the annular space located between the central duct 4 and the mold 2 is filled with coated particles and with grains of graphite. Pitch is then passed through the openings 26 so as to form the compact, the temperature of the pitch being controlled by the temperature of the oil within the pipe 10. After cooling and lowering of the oil temperature within the circulation system 8, the compact of annular shape is removed from the mold.

There is shown in FIG. 2 a second embodiment of the invention in which the mold 2 is pierced by longitudinal channels such as 30 which are parallel to the cylinder generator-lines and into which the pitch is fed through the pipe 34 in the direction of the arrow 32. The hot pitch passes through the openings 26 of the mold and is then mixed with the coated particles within the compact. In this alternative embodiment, a solid compact is obtained after cooling and removal from the mold. In this arrangement, it is clearly possible to form compacts of substantial length since the path of the pitch within the compact is equal to the small dimension of the compact, that is, approximately the radius of the base circle of the cylindrical mold 2.

In the embodiment shown in FIG. 1, the device can be employed only for compacts having a proportion of filling with particles and graphite grains which is less than 45% by reason of the presence of the central duct which it is subsequently necessary to fill with graphitized material or pitch. In the alternative embodiment of the invention shown in FIG. 2, the device permits proportions of filling with particles and graphite grains of the order of 60%.

The characteristics of examples of compacts fabricated in accordance with the invention are given hereunder:

1. - Solid compact

Length: 100 mm

Diameter: 16 mm

Fissile particles: diameter : 500 $\mu$m approx.

Fertile particles: diameter : 800 $\mu$m approx.

Graphite granules: diameter from 500 to 1000 $\mu$m

The pitch fills the spaces existing within the mold between these three solid particles after precompression of the particle mixture.

Proportion of filling with particles: approx. 60%

Precompression: approx. 15 kg/cm$^2$

Injection of pitch: between 50 and 80 kg/cm$^2$ at a temperature within the range of 150° to 180° C.

After removal from the mold : baking up to 1800° C

Wholly satisfactory mechanical strength.

2. Annular compact

Same characteristics with the exception of the following:

Internal diameter: 8 mm

Proportion of filling with particles : approx. 60% of the annular space, namely approx. 45% of the cylinder which is assumed to be solid.

What we claim is:

1. A method of fabrication of nuclear fuel compacts in which a cylindrical mold is filled with coated particles containing fissile and fertile materials as well as grains of graphite if necessary and said mold is heated to a temperature which is higher than the softening temperature of pitch, wherein said pitch is injected into said hot mold through openings located at regular intervals over the entire length of a cylindrical wall of the mold, the injection of pitch being performed at right angles to the generator-lines of the cylinder constituted by the mold and through said openings whose diameter is smaller than the size of the coated particles.

2. A method according to claim 1, wherein the pitch is injected in a radial direction pointing towards the exterior of the cylinder, the pitch being stored within an internal cylindrical duct pierced by openings and constituting the internal wall of the mold, thereby producing a compact of annular shape after removal from the mold.

3. A method according to claim 1, wherein the pitch is injected through openings in an outer cylindrical wall of the mold so arranged as to direct the stream of pitch towards the axis of the cylinder, said openings being fed by channels in said outer cylindrical wall connecting with an external supply of melted pitch supplied under pressure, thereby to form a solid cylindrical compact.

4. A device for the fabrication of nuclear fuel compacts, wherein said device comprises:
   a mold of approximately annular shape filled with coated particles and if necessary with grains of graphite,
   means for controlling the temperature of said mold,
   a hollow cylindrical central duct forming the internal wall of said mold and containing pitch under pressure, said duct being pierced by radial openings through which the pitch is injected into the mold,
   two pistons performing the function of plugs, said pistons being located at the upper and lower ends of said mold, one of them supporting said central duct, and
   means, including a channel through said piston supporting said duct, for injecting the pitch under pressure into the central duct.

5. A device according to claim 4, wherein the central duct contains a leak-tight piping system in which a thermal fluid is circulated.

6. A device for the fabrication of nuclear fuel compacts, wherein said device comprises:
   a mold of approximately cylindrical shape filled with coated particles and if necessary with grains of graphite,
   means for controlling the temperature of said mold,
   channels cut in the mold wall and radial openings connecting said channels with the interior of the mold, said openings being of a cross-section smaller than those of said particles and grains,
   two plungers which perform the function of end plugs and are located at the upper and lower ends of said mold,
   means for injecting pitch under pressure into the interior of said channels.

7. A device according to claim 5, wherein said device comprises a system for the circulation of a temperature-controlled thermal fluid which is in contact with the mold wall.

8. A method according to claim 1, wherein the temperature of injection of the pitch is in the vicinity of 180° C and the injection pressure of said pitch is in the vicinity of 80 bar.

* * * * *